G. W. MORRIS.
CLUTCH.
APPLICATION FILED DEC. 10, 1909.
1,008,355.
Patented Nov. 14, 1911.
2 SHEETS—SHEET 1.
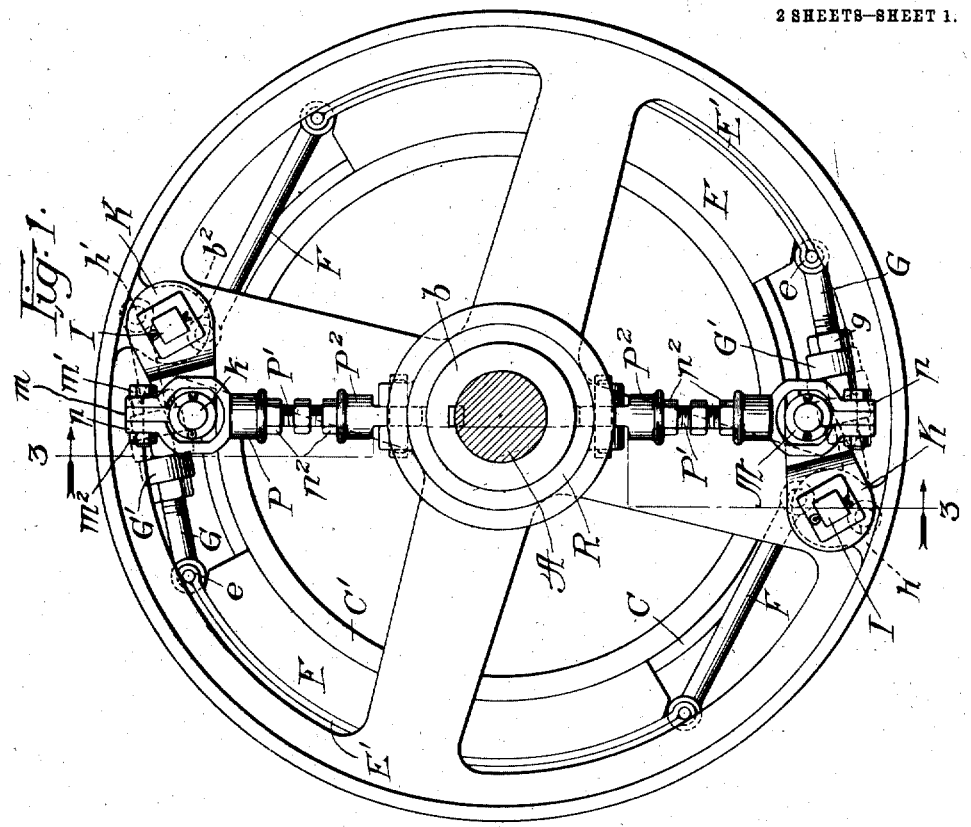
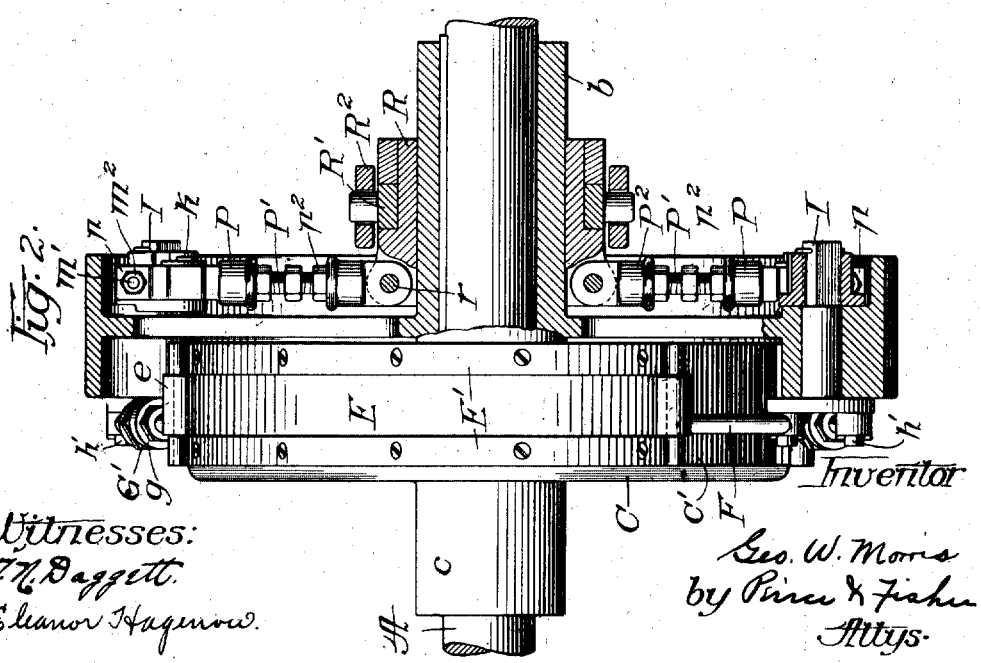
Witnesses:
J. N. Daggett.
Eleanor Hagenow.
Inventor
Geo. W. Morris
by Pierce & Fisher
Attys.

G. W. MORRIS.
CLUTCH.
APPLICATION FILED DEC. 10, 1909.
1,008,355.
Patented Nov. 14, 1911.
2 SHEETS—SHEET 2.
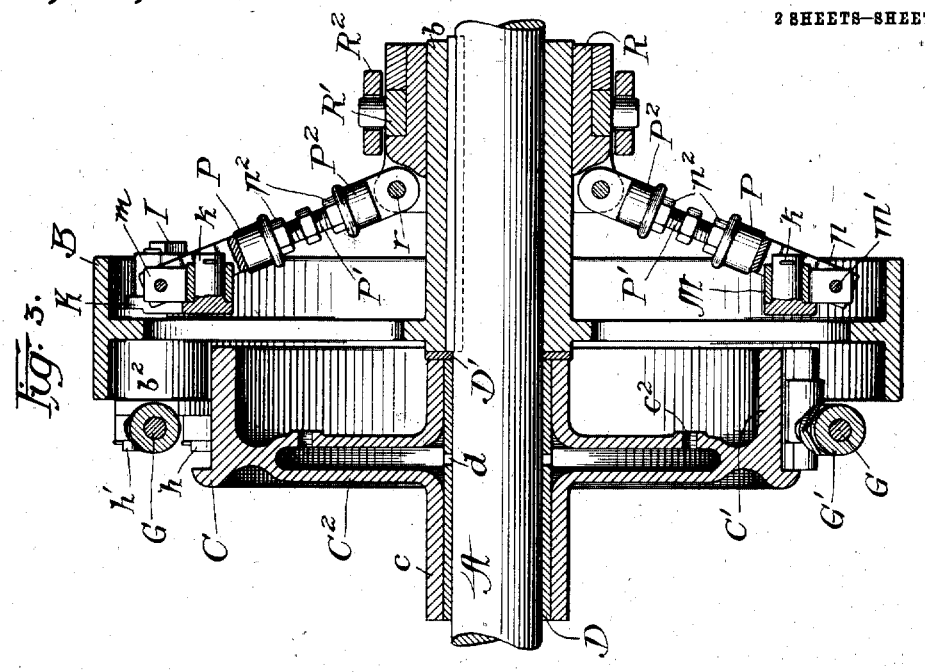
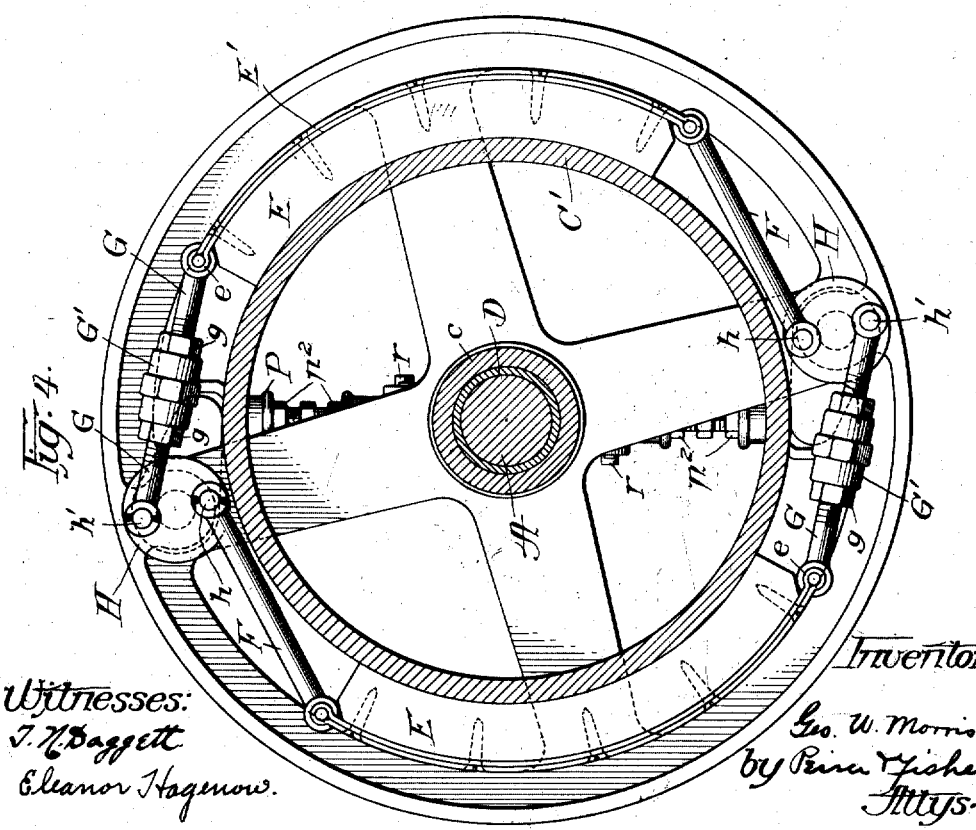
Witnesses:
J. N. Baggett
Eleanor Hagenow.
Inventor
Geo. W. Morris
by Pierce & Fisher
Attys.

UNITED STATES PATENT OFFICE.

GEORGE W. MORRIS, OF RACINE, WISCONSIN.

CLUTCH.

1,008,355.  Specification of Letters Patent.  Patented Nov. 14, 1911.

Application filed December 10, 1909. Serial No. 532,299.

*To all whom it may concern:*

Be it known that I, GEORGE W. MORRIS, a subject of King Edward VII, and a resident of Racine, county of Racine, and State of Wisconsin, have invented certain new and useful Improvements in Clutches, of which I do declare the following to be a full, clear, and exact description, reference being had to the accompanying drawings, forming part of this specification.

My present invention has for its object to provide an exceedingly, simple, durable and effective clutch which, while especially well adapted for use in connection with traction engines and motor driven vehicles of various kinds, is applicable also for use in a variety of other situations.

The invention consists in the features of novelty hereinafter described, illustrated in the accompanying drawings and particularly pointed out in the claims at the end of this specification.

Figure 1 is a view in side elevation of a clutch embodying my invention. Fig. 2 is a view partly in vertical section through the female member of the clutch, the male clutch and shoes being shown in elevation. Fig. 3 is a view in vertical section on the line 3—3 of Fig. 1. Fig. 4 is a view in vertical cross section through the shaft and through the male member of the clutch, the female member and other parts of the clutch being shown in elevation.

A designates the shaft whereon the clutch is mounted. As shown, the female member B of the clutch comprises a hub $b$ that is suitably keyed to the shaft A. The male member C of the clutch is formed with an extended hub $c$ that is loosely mounted on the shaft, and this hub will be provided with suitable means (not shown) for transmitting its motion to the parts to be driven. A lining D of phosphor bronze or other suitable anti-friction metal is interposed between the hub $c$ of the male member and the shaft A and, as shown, a ring D' of brass or similar anti-friction material is interposed between the inner end of the hub $c$ of the male member and the adjacent end $b$ of the female member.

The rim C' of the male member is connected with a hub $c$ by means of a chambered web $C^2$, or if preferred, chambered spokes may be employed instead of the chambered web. The chamber within the web $C^2$ is designed to receive a suitable lubricant, that will be delivered through suitable holes $d$ formed in the anti-friction sleeve D to the surface of the shaft A. In the wall of the chambered web $C^2$ will be formed suitable threaded openings $c^2$ to permit lubricant to be delivered into the chamber of the web $C^2$, it being understood that these holes $c^2$ will be closed by suitable threaded plugs. The holes $d$ in the anti-friction sleeve or lining D will be of suitable number to allow the oil or lubricating material to find its way to the shaft A to lubricate it when in motion. But when the machine is stationary then the lubricant will fall by gravitation into the lower part of the annular space of the chambered web C and remain there without leakage or waste, until rotation is imparted to the clutch.

Over the periphery of the rim C' of the male clutch member are set the shoes E of wood or like suitable material. To these shoes E are suitably attached by bolts or screws, the straps E'. Preferably, the straps E' are formed as metal bands having eyes $e$ at their ends to receive the pivot pins that connect the ends of the straps respectively to the links F and G. Each of the links F has its end that is farthest from the shoe E, pivotally connected to a wrist pin $h$ projecting outwardly from a disk H at the end of a short shaft I. Each of these disks H is provided also with a second wrist pin $h'$, to which is pivotally connected the outer section of the link G. The two sections of each of the links G are united together by a right and left threaded coupling sleeve G' that engages corresponding threaded portions of the link sections G. By this means the links G may be readily adjusted as to length and lock nuts $g$ upon the sections of the link G will securely retain the link sections in position when adjusted. Each of the short shafts I is journaled within a bearing boss $b^2$ of the female clutch member B, and upon the polygonal end portion of each of the shafts I is fixed a crank arm K that carries at its end a wrist pin $k$. On each of the wrist pins $k$ is placed a sleeve M having an arm $m$ that is pivotally connected by a pivot bolt $m'$ to the end section of the corresponding toggle lever by which the crank K will be actuated. As shown, each of the toggle levers of my improved clutch comprises a yoke-shaped section P through the upper ends $p$ of which a pivot bolt $m'$ passes, the free end of this bolt being furnished with a suitable retaining nut $m^2$. The yoke member P of each toggle lever, as clearly seen in Fig. 1, is sufficiently large to enable this member to encircle and move freely with respect to the wrist pin $k$ and the sleeve M. The inner end of each of the memebers B is screw threaded to receive one end of a right and left threaded rod P′ forming part of the toggle lever, the inner end of this rod P′ fitting into a correspondingly threaded hole in the member P² of the toggle lever, and suitable jam nuts $p^2$ will be employed to maintain the adjustment of the members of the toggle lever. The inner member P² of each toggle lever is pivotally connected, as at $r$ to a sleeve R that is slidably mounted upon the hub $b'$ of the female clutch member, this sliding sleeve R being provided with the usual trunnion band R′ that will be actuated in the usual manner by the arms of a forked lever R². By providing a hinge joint between the outer end of the forked end of each toggle lever and corresponding crank arm K at a point beyond the crank arm, an exceedingly simple, easy and effective means is provided for transmitting the movement of the toggle levers to the bell crank with much less strain upon the parts and with greater freedom of movement and greater range of adjustment than is possible where the toggle levers are connected by ball and socket joints to the parts shifted thereby.

From the foregoing description it will be seen that when it is desired to transmit rotation from the shaft A to the male clutch member C, the operator will move inwardly the sliding sleeve R, thereby causing the toggle levers to move radially outward and in doing so, to shift the crank arms K, so as to cause the disks H through the medium of the links F and G to bring the shoes E into bearing with the rim C′ of the male clutch member C.

It will be understood that the precise details of construction above put out may be varied without departure from the spirit of the invention, and that features of the invention may be employed without its adoption as to entirety.

Having thus described my invention, what I claim as new and desire to secure by Letters Patent, is:—

1. A clutch of the character described comprising a male member provided with a rim, a friction shoe for engagement with said rim, a female member and means carried by the female member for actuating said shoe comprising a short shaft passing through the female member, links pivotally connecting said shoe to one end of said short shaft at diametrically opposite sides of said shaft, a crank arm mounted upon the opposite end of said short shaft, said crank arm being provided with a part extending outward toward the periphery of the female clutch member and a toggle lever pivotally connected at its outer end to said part that projects outward from said crank arm and a sliding sleeve pivotally connected to the opposite end of said toggle lever.

2. A clutch of the character described comprising a male member provided with a rim, friction shoes for engagement with said rim, a female member, and means carried by said female member for actuating said shoes comprising a short shaft passing through the female member and provided at one end with wrist pins, links connecting said wrist pins with said friction shoes on one side of the female member, a crank arm upon the opposite end of said short shaft, a pin projecting from said crank arm, a sleeve having an outwardly projecting arm mounted upon said pin, a toggle lever pivotally connected to said projecting arm and a sliding sleeve pivotally connected to the inner end of said toggle lever.

3. A clutch of the character described comprising a male member provided with a rim, friction shoes for engagement with said rim, a female member, and means carried by said female member for actuating said shoes comprising a short shaft passing through the female member and connected at one side thereof with said friction shoes, a crank arm mounted upon said short shaft at the opposite side of said female member, a wrist pin projecting from said crank arm, a sleeve encircling said wrist pin and provided with an outward extension, a toggle lever having a yoke-shaped part extending around said wrist pin and pivotally connected to said outward extension and a sliding sleeve pivotally connected to the inner end of said toggle lever.

4. A clutch of the character described comprising a male member provided with a rim, friction shoes for engagement with said rim, a female member, and means carried by said female member for actuating said shoes comprising a short shaft passing through the female member and provided at one end with wrist pins, links connecting said wrist pins with said friction shoes, a crank arm upon the opposite end of said short shaft, a sleeve mounted upon a pin on said crank arm and having an outwardly extending arm or projection, an adjustable toggle lever pivotally connected to said outwardly extending arm or projection and a sliding sleeve pivotally connected to the inner end of said toggle lever.

5. A clutch of the character described comprising a male member provided with a rim, friction shoes mounted to engage said rim at opposite points, a female member, and means carried by said female member for actuating said shoes comprising oppositely disposed short shafts passing through said female member and provided at one side thereof with wrist pins, links connecting said wrist pins with the friction shoes, crank arms mounted upon said short shafts at the opposite side of the female member, said crank arms having wrist pins, sleeves mounted upon said wrist pins, toggle levers pivotally connected at their outer ends to said sleeves, and a sliding sleeve to which the inner ends of said toggle levers are pivoted.

GEORGE W. MORRIS.

Witnesses:
DAGMAR CONSTANCE CARLSEN,
HATTIE AUDROMEY FAGERSTROM.